May 29, 1945.   C. N. KIMBERLIN, JR   2,377,243
PROCESS OF PREPARING ETHYL BENZENE
Filed Dec. 31, 1941
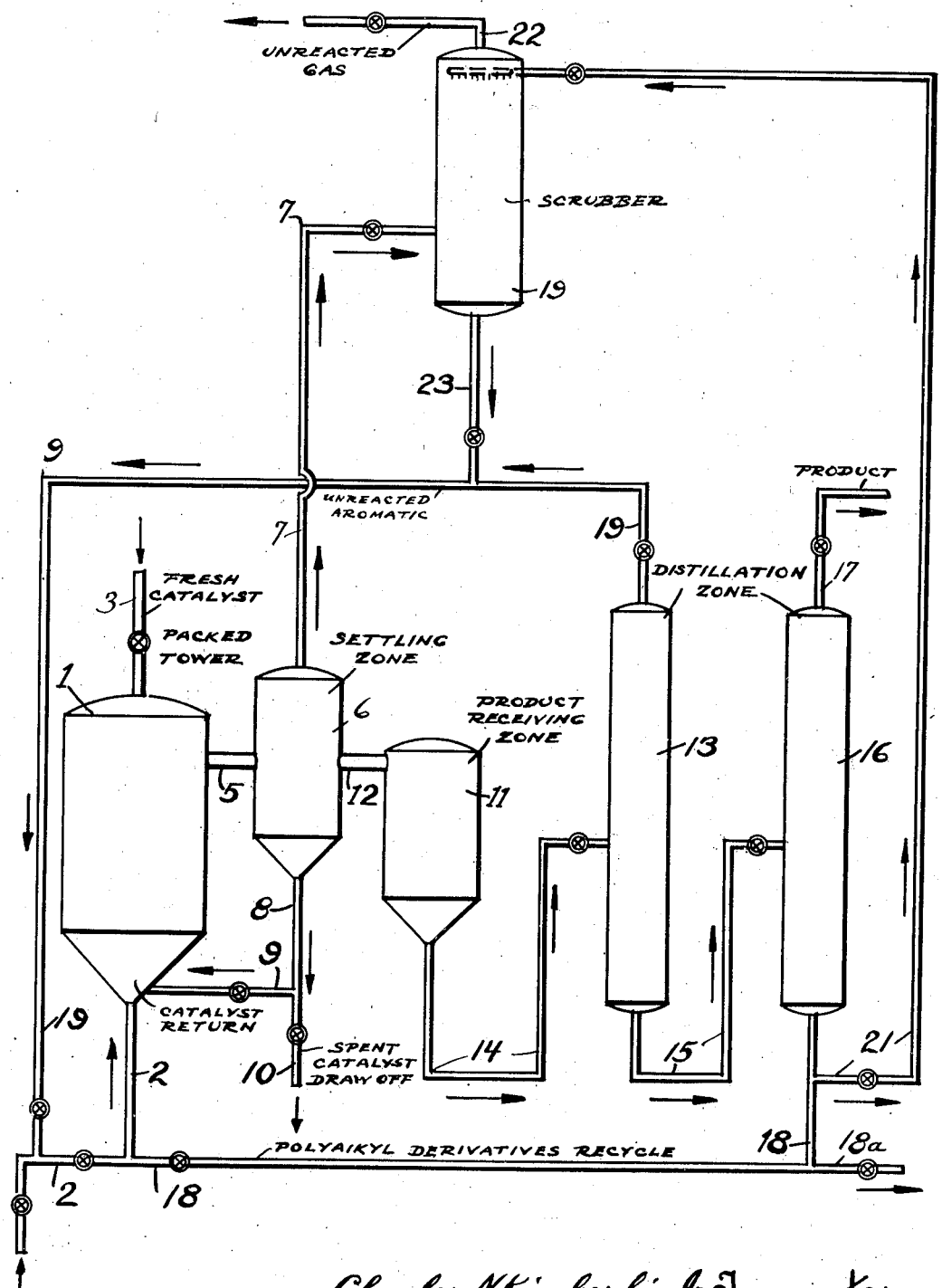

UNITED STATES PATENT OFFICE 2,377,243

PROCESS OF PREPARING ETHYL BENZENE

Charles N. Kimberlin, Jr., Baton Rouge, La., assignor to Standard Oil Development Company, a corporation of Delaware Application December 31, 1941, Serial No. 425,055

1 Claim. (Cl. 260—671)

The present invention relates to improvements in a process for ethylating benzene and relates particularly to improvements for the continuous production of monoethyl benzene with a minimum use of benzene.

It is well known in the art to react aromatic and olefinic hydrocarbon constituents for the production of alkylated aromatic compounds. For example, it is known in the art to produce mono-ethyl benzene by reacting benzene and ethylene under suitable conditions and in the presence of a Friedel-Crafts type catalyst. These reactions are generally conducted at a temperature in the range from about 125° F. to about 250° F. Conventional operating temperatures are in the range from about 160° F. to about 200° F. The catalyst employed usually comprises a metallic halide such as aluminum chloride, zinc chloride, or iron chloride. Hydrogen chloride or alkyl halides are sometimes added as promoters. However, in these reactions, particularly in operations conducted for the production of monoethyl benzene, it is relatively difficult to control the course of the reaction so that a relatively high yield of monoethyl benzene is secured rather than polyethyl benzenes and higher constituents. One method which has been found to increase the yield of monoethyl benzene as compared to polyethyl benzenes is to separate the polyethyl benzenes from the products of reaction and recycle them to the reaction zone. It is likewise difficult to react all of the benzene and also to recover all of the unreacted benzene from the escaping gases. While it would be desirable in many respects to use ethylene gas of comparatively high purity for the reaction, ordinarily such a gas is not readily available for commercial operations and ethylene diluted with large amounts of ethane as well as smaller amounts of other unreactive gases is used. These gases which dilute the ethylene pass through the reaction unchanged and are generally vented from the system for use as fuel or any other suitable purpose. The temperature of the reaction is ordinarily higher than the temperature at which the gases are discharged from the system so they are saturated with benzene vapor. The amount of benzene lost in this manner represents an appreciable proportion of the total benzene feed.

A typical ethylene gas available commercially contains approximately 38% ethylene and approximately 62% ethane. Thus when 100 mols of benzene are treated with 37 mols of ethylene to produce ethyl benzene under suitable reaction conditions, the ethylene is diluted with approximately 60 mols of ethane. When 90% of the ethylene is converted to ethyl benzene or other products of the reaction, the outlet gas contains the 60 mols of ethane together with about 4 mols of unreacted ethylene. When this gas is separated from the products of reaction at 30° C., it contains about 11% of the benzene feed. If the temperature of the separation is decreased to 20° C., the amount of benzene lost is 6% and even at the freezing point of benzene approximately 3% will be lost in the waste gases.

An object of this invention is to provide a method of recovering the benzene that is expelled from the reaction vessel with the unreacted hydrocarbon gases.

The process of this invention will be readily understood by referring to the attached drawing illustrating the embodiments of the same.

Referring to the drawing, the feed material, comprising olefinic and aromatic constituents, is introduced into reaction zone 1 comprising a packed tower by means of line 2. Fresh catalyst, which for the purpose of description is taken to be aluminum chloride, is introduced into reaction zone 1 by means of line 3. Intimate mixing between the catalyst and the feed constituents is secured by means of the packed tower. The temperature and pressure conditions within reaction zone 1 are maintained to secure maximum yield of the desired product. The reaction products together with the catalyst overflow by means of conduit 5 into settling zone 6. Unreacted gases are removed overhead from settling zone 6 by means of line 7, while the catalyst which separates, is removed from the bottom of the zone 6 by means of line 8. This catalyst may be recycled to zone 1 by means of line 9 or withdrawn from the system by means of line 10. The reaction products are passed to product receiving zone 11 by means of line 12 and then introduced into distillation zone 13 by means of line 14. Temperature and pressure conditions in distillation zone 13 are adjusted to remove overhead by means of line 19 unreacted aromatic constituents which are preferably recycled to zone 1 with the fresh feed. The alkylated aromatics are withdrawn from zone 13 by means of line 15 and passed to distillation zone 16 wherein temperature and pressure conditions are adjusted to remove overhead by means of line 17 the desired product. The heavier boiling constituents are removed as bottoms by means of line 18 and may be recycled to zone 1. When the operation is conducted for the production of monoethyl benzene, the monoethyl benzene is removed by means of line 17 and any polyethyl benzenes formed by means of line 18. A part of the polyethyl benzenes may be discharged from the system through line 18'.

The unreacted gases removed by means of line 7 contain substantial amounts of benzene vapors. To recover this benzene the gases are passed to packed tower 25 into the upper part of which polyethyl benzenes are introduced by means of line 20. The polyethyl benzenes are obtained from line 18 by means of line 21. The benzene is absorbed from the gases by the polyethyl benzenes in the packed tower 25. The unreacted gases from which the benzene has been absorbed are removed from the packed tower 25 by means of line 22 and vented from the system. The polyethyl benzenes with the recovered benzene in solution are passed from the lower part of the tower through line 23 to line 19 and then recycled to the reaction zone 1.

Since the polyethyl benzenes produced in the reaction have a comparatively low vapor pressure, they constitute an excellent solvent for scrubbing the benzene from the unreacted gases. To insure good recovery of the benzene it is desirable to circulate the polyethyl benzenes at such a rate that their content of dissolved benzene does not exceed a value of about 10%. The recycling of polyethyl benzenes to the reaction zone is desirable to increase the proportion of monoethyl benzene produced in the reaction so it is evident that the use of these by-products as an absorption medium for the benzene in the unreacted gases is particularly advantageous in that it eliminates a separation step which would be required if an absorption medium were used which could not be recycled to the reaction zone.

It is not intended to limit this invention to the recovery of benzene in the particular reaction of ethylene and benzene as the process is also suitable for use in the production of practically any alkylated benzene.

I claim:

A process for alkylating aromatics which comprises passing a feed material containing benzene, ethylene and ethane into the bottom of a reaction zone in which a body of catalyst is maintained at a temperature of about 160° F. to alkylate the benzene, adapting operating conditions so that unreacted constituents, reaction products and catalyst overflow to a settling zone wherein unreacted gaseous constituents saturated with benzene vapors separate from the reaction products and the catalyst, recovering monoethyl benzene and polyethyl benzenes from the products of reaction, scrubbing the unreacted vaporized constituents with the polyethyl benzenes, separating the polyethyl benzenes with benzene in solution from gaseous reaction products and recycling the solution of benzene in polyethyl benzenes to the reaction zone.

CHARLES N. KIMBERLIN, Jr.